(12) United States Patent
Rabitsch et al.

(10) Patent No.: US 7,785,531 B2
(45) Date of Patent: Aug. 31, 2010

(54) ALLOY FOR ROLLER BEARING

(75) Inventors: Roland Rabitsch, Schladming (AT); Sven Peissl, Weisskirchen (AT); Reinhold Ebner, Trofaiach (AT); Sabine Eglsaeer, Bruck/Mur (AT)

(73) Assignee: Boehler Edelstahl GmbH, Kapfenberg (AT)

( * ) Notice: Subject to any disclaimer, the term of this patent is extended or adjusted under 35 U.S.C. 154(b) by 0 days.

(21) Appl. No.: 11/687,801

(22) Filed: Mar. 19, 2007

(65) Prior Publication Data

US 2007/0215251 A1 Sep. 20, 2007

(30) Foreign Application Priority Data

Mar. 20, 2006 (AT) .................. A 456/2006

(51) Int. Cl.
*C22C 38/44* (2006.01)
*C22C 38/46* (2006.01)

(52) U.S. Cl. .......... 420/69; 420/111; 148/325; 148/326; 148/334; 148/335; 148/906; 384/625; 384/912

(58) Field of Classification Search ............. 148/325, 148/326, 334, 906, 335; 420/69, 111; 384/625, 384/912
See application file for complete search history.

(56) References Cited

U.S. PATENT DOCUMENTS

| | | | |
|---|---|---|---|
| 4,150,978 A | 4/1979 | Schlatter et al. | |
| 4,183,774 A | 1/1980 | Balleret | |
| 4,487,630 A | 12/1984 | Crook et al. | |
| 5,531,836 A | 7/1996 | Dezzani et al. | |
| 5,800,637 A * | 9/1998 | Yamamura et al. | 148/318 |
| 5,860,749 A * | 1/1999 | Hirakawa et al. | 384/492 |
| 5,873,956 A * | 2/1999 | Tanaka et al. | 148/318 |
| 6,095,692 A | 8/2000 | Takemura | |
| 6,224,688 B1 | 5/2001 | Takemura et al. | |
| 6,565,677 B1 * | 5/2003 | Takemura et al. | 148/325 |
| 6,602,360 B2 * | 8/2003 | Takemura et al. | 148/333 |
| 2004/0042926 A1 | 3/2004 | Shimizu | |
| 2006/0011269 A1 | 1/2006 | Miyauchi | |

FOREIGN PATENT DOCUMENTS

| | | |
|---|---|---|
| DE | 19707033 | 11/1997 |
| EP | 0718416 | 6/1996 |
| EP | 1352980 | 10/2003 |
| GB | 2342409 | 4/2000 |
| GB | 2344828 | 6/2000 |

(Continued)

OTHER PUBLICATIONS

Derwent publication Acc-No. 1991-211856, English abstract of Japanese patent 03-134136, Kada et al., Jun. 7, 1991.*

(Continued)

*Primary Examiner*—Deborah Yee
(74) *Attorney, Agent, or Firm*—Greenblum & Bernstein, P.L.C.

(57) ABSTRACT

An alloy for aircraft roller bearings containing:
0.45 to 1.0 wt. % carbon,
max 2.0 wt. % manganese,
max 1.0 wt. % silicon,
8.5 to 11.5 wt. % chromium,
1.0 to 4.5 wt. % molybdenum,
1.0 to 2.5 wt. % vanadium,
max 2.0 wt. % tungsten,
max 0.5 wt. % niobium,
max 0.5 wt. % tantalum,
max 3.0 wt. % nickel,
max 0.5 wt. % cobalt,
max 0.1 wt. % aluminum,
max 0.01 wt. % nitrogen, and
the balance being iron and impurities due to production.

20 Claims, 8 Drawing Sheets

| | FOREIGN PATENT DOCUMENTS | | |
|---|---|---|---|
| JP | 03-134136 | * | 6/1991 |
| JP | 11-080897 | | 3/1999 |
| JP | 2000-204445 | | 7/2000 |
| JP | 2000-282178 | * | 10/2000 |
| JP | 2006-038167 | | 2/2006 |
| SU | 933785 | * | 6/1982 |

OTHER PUBLICATIONS

English Language Abstract of JP 2000-204445, Jul. 25, 2000.
English Language Abstract of JP 2006-038167, Feb. 9, 2006.
English Language Abstract of JP 11-080897, Mar. 26, 1999.

* cited by examiner

Alloy D

Alloy G

ALLOY FOR ROLLER BEARING

CROSS-REFERENCE TO RELATED APPLICATIONS

The present application claims priority under 35 U.S.C. §119 of Austrian Patent Application No. A 456/2006, filed on Mar. 20, 2006, the disclosure of which is expressly incorporated by reference herein in its entirety.

BACKGROUND OF THE INVENTION

1. Field of the Invention

The invention relates generally to an alloy for aircraft roller bearings, as well as an alloy for a bearing or bearing part.

2. Discussion of Background Information

During operation, roller bearings of vehicles are typically subjected to diverse loads and stresses, which they are to withstand for as long as possible. These include, e.g., dynamic mechanical loads through sliding against one another or rolling of bearing parts and corrosion attack by corrosive lubricants. In the case of aircraft, an additional problem is that working temperatures of roller bearings can be in the range of several hundred degrees Celsius. For example, in the case of roller bearings of aircraft turbines temperatures of around 250° C. can be measured even in the coasting down phase when, although a load is slight, there is no longer any cooling.

Particularly high demands are therefore made on roller bearings for aircraft, e.g., with respect to load-bearing capacity and operational life in order to be serviceable. Great strength and toughness, low wear and low rolling contact fatigue in use are required as well as a high corrosion resistance even at increased temperatures. In addition, a surface of the roller bearing should have a satisfactory reactivity with respect to the additive tricresyl phosphate, which is present in the predominantly used aviation turbine oil, e.g., Mobil Jet Oil II, so that a protective reaction layer can be formed to minimize wear. The reactivity of the bearing surface with the lubricant additive depends considerably on the chemical nature of the bearing surface. Considered overall, this produces a complex profile of requirements for roller bearings for aircraft. This profile is to be met by the use of a suitable alloy.

According to DIN 17230, the most common roller bearing materials are subdivided into five groups, namely:

(1) through-hardenable roller bearing steels (e.g., 100Cr6 or SAE 52100), (2) case-hardening steels (e.g., 17MnCr5 or SAE 8620), (3) quenched and tempered steels (e.g., 43CrMo4 or SAE 4340), (4) corrosion-resistant steels (e.g., AISI 440C, X30CrMoN15 or X45Cr13), and (5) heat-resistant steels and hard alloys (e.g., M50 or AISI T1).

Out of the available material groups, heat-resistant steels have become accepted for the bearings of aircraft, whereby the alloy M50, a low-alloy high-speed steel, and variants of this alloy are chiefly used. The leading role held for decades by the alloy M50 as roller bearing material for aircraft is due to its mechanical properties and good fatigue properties. However, the corrosion resistance is completely unsatisfactory, but this has been tolerated until now due to a lack of alternative alloys.

Since there is a consistent desire for more efficient and more reliable roller bearings, attempts are being made to find improved alloys comparable to alloy M50. For example, U.S. Pat No. 4,150,978, which is expressly incorporated herein by reference in its entirety, discloses individual alloys in the composition range (in % by weight) 0.8 to 1.6% carbon, max. 0.5% silicon, max. 0.5% manganese, max. 0.1% sulfur, max. 0.015% phosphorus, 12 to 20% chromium, 2 to 5% molybdenum, up to 3% tungsten, 0.5 to 3.0% vanadium, up to 0.5% titanium, max. 0.03% aluminum, max. 0.5% nickel, max. 0.5% cobalt, max. 0.5% copper, max.0.05% boron, max. 0.05% nitrogen, the balance being iron and impurities. Compared to M50, these alloys exhibit a better behavior in the rolling contact test and should also be useable in corrosive media, but have not become accepted in practice.

Another approach today lies in using surface hardening of corrosion-resistant alloys with max. 0.1% by weight carbon and chromium contents of at least 13% by weight. However, in order to obtain adequate surface hardnesses and thus an adequate wear resistance, these materials have to be subjected to case hardening methods, such as, e.g., carburization and nitridation. However, the corrosion properties can be considerably affected by the carburization or nitridation process.

Although known alloys for aircraft roller bearings can in each case conform to several properties with regard to the profile of requirements described at the outset, they fall down considerably on at least one property, e.g., corrosion resistance. Such a drop-off in one property is usually enough to reduce the operational life substantially, thus restricting the field of application for a roller bearing. It is ultimately irrelevant for the value and the useful life of a roller bearing whether it needs to be replaced due to the occurrence of fatigue or corrosion. In other words, the best mechanical properties cannot be utilized if corrosion leads to premature failure of the bearing. Conversely, the highest corrosion resistance is useless if fatigue fractures and/or premature wear occur after a short time in use.

SUMMARY OF THE INVENTION

The present invention provides an alloy from which it is possible to produce roller bearings that also have high corrosion resistance in addition to good mechanical properties, low wear and low rolling contact fatigue.

The present invention also provides bearings or bearing parts, in particular roller bearings or roller bearing parts, that also have high corrosion resistance in addition to good mechanical properties, low wear and low rolling contact fatigue.

In one exemplary embodiment, the present invention provides an alloy for aircraft roller bearings containing:

0.45 to 1.0 wt. % carbon,
max 2.0 wt. % manganese,
max 1.0 wt. % silicon,
8.5 to 11.5 wt. % chromium,
1.0 to 4.5 wt. % molybdenum,
1.0 to 2.5 wt. % vanadium,
max 2.0 wt. % tungsten,
max 0.5 wt. % niobium,
max 0.5 wt. % tantalum,
max 3.0 wt. % nickel,
max 0.5 wt. % cobalt,
max 0.1 wt. % aluminum,
max 0.01 wt. % nitrogen, and
the balance being iron and impurities due to production.

Carbon may be present in the alloy in an amount of 0.55 to 0.85 wt. %

Carbon may be present in the alloy in an amount of up to 0.75 wt. %.

Chromium may be present in the alloy in an amount of 9.5 to 10.5 wt. %.

Molybdenum may be present in the alloy in an amount of 2.5 to 3.5 wt. %.

Molybdenum may be present in the alloy in an amount of 2.65 to 3.25 wt %.

Vanadium may be present in the alloy an amount of 1.65 to 2.25 wt. %.

Vanadium may be present in the alloy in an amount of 1.8 to 2.5 wt. %.

Tungsten may be present in the alloy an amount of 0.5 wt. % max.

Manganese may be present in the alloy in an amount of 0.3 wt. % max.

Silicon may be present in the alloy in an amount of 0.05 to 0.2 wt. %.

Nickel may be present in the alloy in an amount of 0.5 wt. % max.

Carbide may be present in the alloy in an amount of 0.5 to 7% by volume.

Metal carbides of the type $M_7C_3$ may be present in the alloy in an amount less than 3% by volume.

The present invention also provides a bearing or bearing part made from the alloy of the present invention. In one embodiment, the bearing or bearing part further includes a roller bearing or roller bearing part.

The present invention also provides a method of using an alloy according to the present invention, including using the alloy as a part or component in an aircraft.

The advantages of the alloy according to the present invention lie in particular in its profile of properties, based on which the alloy is excellently suitable for aircraft roller bearings. This profile of properties includes in particular high strength, low wear and good rolling contact fatigue in use as a roller bearing material and an extraordinarily high corrosion resistance. In order for this profile of properties to be attained, the contents of individual alloying elements are coordinated in a targeted manner, whereby the contents according to the invention are the expression of the effects of individual alloying elements as well as the interactions among them. These effects are described below.

With an alloy according to the invention, in addition to iron and impurities due to manufacture, elements are also present in the following amounts (all in percentage by weight unless otherwise noted):

Carbon (C) is provided in an amount of 0.45 to 1.0% in order to give an alloy according to the invention a high degree of hardness. With contents above 1.0% there is a danger that particularly the chromium-rich metal carbides of the type $M_7C_3$ will form, whereby this metal, which is responsible for a corrosion resistance, is extracted from the matrix, with a consequent decrease in corrosion resistance. Moreover these $M_7C_3$ carbides are coarse, which has a negative effect on wearing behavior with bearings. Carbon contents below 0.45% lead to low hardness and there is the possibility that undesirable δ ferrite will be formed during production. An optimal content of carbon lies in the range of 0.55 to 0.75%. In this content range, a favorable carbide morphology, namely chiefly development of MC carbides or MC mixed carbides, can be achieved. MC carbides contribute to a high degree of hardness, but do not impair the corrosion resistance, since only a small amount of chromium necessary for the formation of the passive layer is extracted from the matrix.

Manganese (Mn) can be present in the alloy in an amount of up to a maximum of 2.0% manganese (Mn). In order to keep a formation of residual austenite low, a manganese content is preferably restricted to a maximum of 0.3%.

Silicon (Si) is necessary for deoxidization and can be provided in an amount up to a maximum of 1.0%. Since silicon can have a considerable embrittling effect and promote a formation of δ ferrite, it is advantageous to keep silicon contents in the range of 0.05 to 0.2%.

Like silicon, aluminum (Al) promotes a formation of δ ferrite. Therefore, the amount of aluminum content should be no more than 0.1%.

Chromium (Cr) is provided in an amount of 8.5 to 11.5%. Chromium amounts above 11.5% can lead to the increased formation of coarse $M_7C_3$ carbides which, as mentioned, have a negative effect on corrosion resistance. The desired corrosion resistance cannot be achieved with chromium amounts below 8.5%. A chromium amount coordinated with the carbon content preferably lies in the range of 9.5 to 10.5%. In this range proportions of $M_7C_3$ carbides are low, and an extremely high corrosion resistance is achieved with good mechanical properties.

Molybdenum (Mo) is present in an amount of 1.0 to 4.5% and in this range, can contribute positively to a high corrosion resistance. Amounts higher than 4.5% with present carbon amounts, surprisingly do not lead to any further increase in the corrosion resistance. Instead, with higher amounts of molybdenum and given carbon, the corrosion resistance tends to decrease. This can be explained by an increased formation of $M_7C_3$ and/or $M_6C$ carbides, which can lead to a molybdenum depletion of the matrix and thus to increased susceptibility to corrosion.

Vanadium (V) is present in an amount of 1.0 to 2.5% and in this range, can effectively promote a formation of desirable MC carbides. With amounts higher than 2.5%, the precipitation of coarse carbides from the melt can occur during production. These coarse carbides are undesirable, since the rolling or sliding properties of bearings can be negatively affected.

With vanadium (V) amounts lower than 1.0%, the effectiveness decreases with respect to the formation of MC carbides.

Tungsten (W) can be provided in amounts up to 2.0%. Amounts higher than 2.0% can be detrimental, since, as with molybdenum contents of above 4.5%, in particular $M_6C$ carbides can be formed and in addition the tendency to form $M_7C_3$ in combination with the present chromium contents increases. Therefore, the tungsten amount is preferably limited to 0.5%.

Niobium (Nb) and tantalum (Ta) can be respectively present in an alloy according to the present invention with a maximum of 0.5% and in these low amounts, can promote a formation of MC carbides. Amounts higher than 0.5% can lead to the direct precipitation of coarse carbides from the melt. These coarse carbides are undesirable, since the rolling or sliding properties of bearings can be negatively affected.

Cobalt (Co) can be present in an amount up to a maximum of 0.5%. At increased tempering temperatures, cobalt (Co) can have a negative effect on corrosion resistance, since it increases the affinity to form $M_7C_3$ carbides. Furthermore, with increasing cobalt (Co) content, the toughness of samples tempered above the secondary hardness maximum deteriorates drastically. It is therefore advantageous to limit the cobalt (Co) amount to less than 0.2%.

Like cobalt (Co), nickel (Ni) can reduce the corrosion resistance due to increased affinity to $M_7C_3$ carbide formation, but increasing Ni content can result in improved ductility properties. Depending on the profile of requirements, the aim should be a nickel (Ni) amount of 0 to 3%.

Nitrogen (N) can promote a residual austenite formation and should therefore be present in an amount of no more than 0.01%.

The present invention further provides a bearing or bearing part including the alloy as noted above. Since the bearing or bearing part fulfills a complex profile of requirements with respect to strength, favorable wearing behavior and low rolling contact fatigue and in addition has an extraordinarily high corrosion resistance, a long operational life is given. The advantages of a bearing or bearing part according to the invention are to be seen in particular herein and in its high load-bearing capacity even with contact with corrosive media or the like.

Further advantages and effects of the invention are apparent from the context of the specification and the exemplary embodiments.

The invention is presented more extensively below based on test results and in comparison with the prior art.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
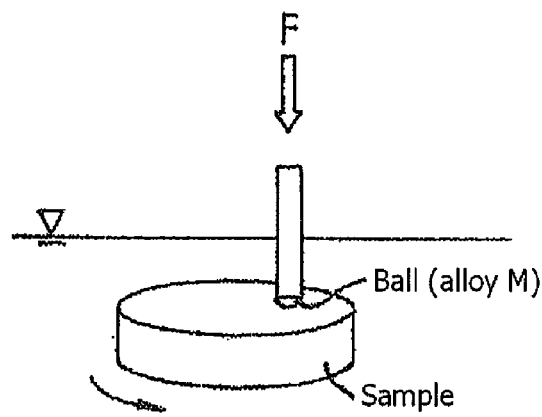
FIG. 1: Depicts a test arrangement to carry out ball-on-disk (BOD) tests.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Table 1 shows chemical compositions of tested alloys. The alloys were smelted or remelted in vacuum. The workpieces thus produced were subsequently subjected to a heat treatment comprising austenitization, quenching and triple tempering for two hours. A residual austenite content was lower than 6 percent by volume in every case.

TABLE 1

Chemical compositions of tested alloys A through M
Chemical composition [in % by weight]

| Alloy | C | Cr | V | Mo | Ni | Co | Si | Mn | Fe |
|---|---|---|---|---|---|---|---|---|---|
| A | 0.66 | 3.92 | 1.55 | 2.96 | 0.04 | | 0.15 | 0.23 | Bal. |
| B | 0.69 | 5.92 | 1.63 | 3.00 | 0.04 | | 0.19 | 0.26 | Bal. |
| C | 0.67 | 7.79 | 1.76 | 2.87 | 0.03 | | 0.16 | 0.25 | Bal. |
| D | 0.60 | 10.10 | 1.99 | 2.90 | 0.04 | | 0.19 | 0.21 | Bal. |
| E | 0.62 | 12.01 | 2.10 | 2.76 | 0.04 | | 0.20 | 0.24 | Bal. |
| F | 0.57 | 9.84 | 2.00 | 1.44 | 0.02 | | 0.15 | 0.22 | Bal. |
| G | 0.69 | 9.61 | 1.90 | 4.24 | 0.05 | | 0.15 | 0.25 | Bal. |
| H | 0.62 | 9.84 | 1.59 | 2.80 | 0.04 | 4.93 | 0.18 | 0.24 | Bal. |
| I | 0.61 | 9.97 | 1.61 | 2.80 | 0.05 | 10.00 | 0.18 | 0.27 | Bal. |
| J | 0.71 | 10.03 | 1.56 | 2.87 | 0.05 | 14.91 | 0.19 | 0.26 | Bal. |
| K | 0.64 | 9.94 | 1.73 | 2.87 | 1.49 | | 0.16 | 0.21 | Bal. |
| L | 0.67 | 9.85 | 1.63 | 2.78 | 2.98 | 4.92 | 0.18 | 0.26 | Bal. |
| M | 0.79 | 4.10 | 1.04 | 4.20 | 0.05 | | 0.20 | 0.26 | Bal. |

I. Characteristic Strength Values

The characteristic strength values and characteristic expansion values of alloys A through L and reference alloy M, which corresponds to the roller bearing material M50, were determined in the heat-treated state. In every case the heat treatment comprised an austenitization at a temperature between 1100° C. and 1200° C., followed by a quenching and a triple tempering of the alloy at temperatures between 510° C. and 585° C.; the hardnesses were 59±1 HRC. It was shown that with these hardnesses tensile strength values $R_{p0.2}$ or $R_m$, of respectively more than 1700 MPa or 2000 MPa were achieved for all the alloys. Alloy D, for example, had an $R_{p0.2}$ value of 2000 MPa and an $R_m$ value of 2334 MPa and thus lies in the range of the values of reference alloy M.

With respect to the characteristic expansion values, in particular the elongation at break, alloys A through D, H, I, K and L are clearly superior to the alloy M. For example, alloys A through D have an elongation at break higher by 50% (e.g., alloy D of 4.44% compared to 2.55% of alloy M). Within the measurement uncertainty alloys E and F have an elongation at break approximately in the range of alloy M. Alloy J has an elongation at break of only 0.07%.

The strengths and expansion values determined show that the alloys tested, with the exception of alloy J, meet the minimum requirements for strength and expansion for materials for roller bearings.

II. Ball-on-Disk Tests

Alloys A through M were tested for their wearing behavior by means of the ball-on-disk test method, as shown in FIG. 1, and the wear trace depth was measured. In order to achieve comparable lubrication conditions in the BOD test as in the aircraft engine bearing, an identical λ value of 0.8 (characteristic number for the contact conditions in the lubrication gap) was set. The test parameters were:

Radius of the trace: 5 mm
Sliding velocity: 10 cm/s
Force applied: 15 N
Length of the wear trace: 1000 m
Ball diameter: 6 mm
Ball material: alloy M
Temperature: 150° C.

Ambient medium: oil (Mobil Jet Oil II)

Figure 2:
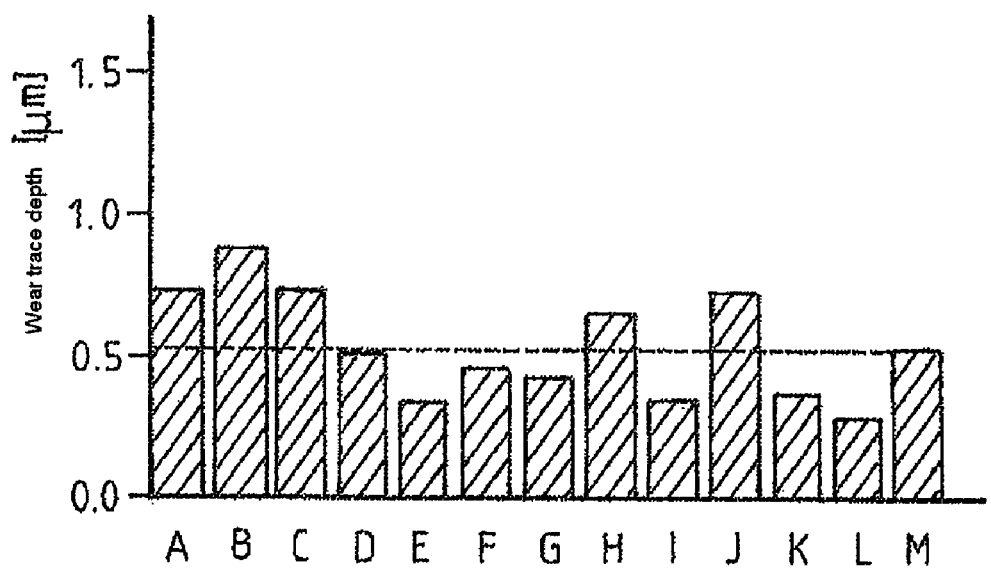
FIG. 2: Shows a diagram of the wear trace depth in BOD tests for alloys A through M.

The results of these tests are shown in FIG. 2. As can be seen, a wear trace depth for alloys D through G and I, K and L, was smaller than for alloy M. This shows that these alloys are excellently suitable as bearing materials with respect to wearing behavior.

III. Rollover Properties (Roll Contact Fatigue Test)

Rollover tests were carried out deliberately with elevated surface pressure with a three-ball-against-shaft tester. A maximum pressure of 6400 GPa prevailed in the contact area under test conditions.

Figure 3:
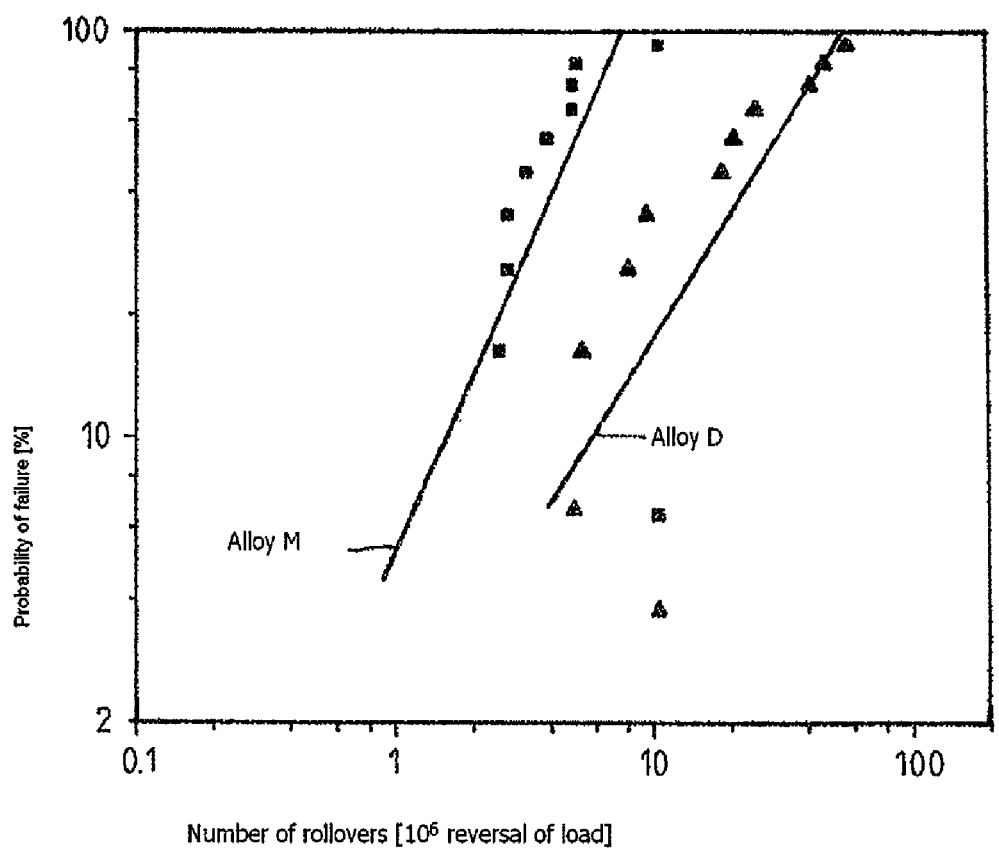
FIG. 3: Shows a graph of the operational life achieved for samples of alloys D and M with rollover tests.

The results or the Weibull distributions showed that alloys A through L, with the exception of alloy J, yield an operational life that is the same as or greater than that of alloy M in the rollover test. With respect to rollover characteristics, it is shown in particular for alloy D that this alloy has much better properties compared to alloy M (see FIG. 3): During rollover there is a failure probability of 10% for alloy D with $5.50 \times 10^6$ reversal of load. With alloy M the same failure probability is already achieved at $1.57 \times 10^6$ reversals of load.

IV. Corrosion Resistance

To sum up the test results shown under I through III, it can be stated that alloys D, E, F, G, I, K and L the requirements with respect to strength, expansion, wearing behavior and rollover characteristics lie in the range of alloy M or the standard material M50 and therefore meet the requirements in this respect for roller bearing materials.

Tests were conducted to test the corrosion resistance of the alloys. In particular, the alloys were tested to see if they could be used in corrosive media, which is not the case for the rapidly corroding high-speed steel M50 or alloy M. These tests were carried out by recording current density potential curves in an aqueous sodium chloride solution with a content of 50 ppm chloride ions. From these records the pitting potential was read off for the individual alloys.

Figure 4:
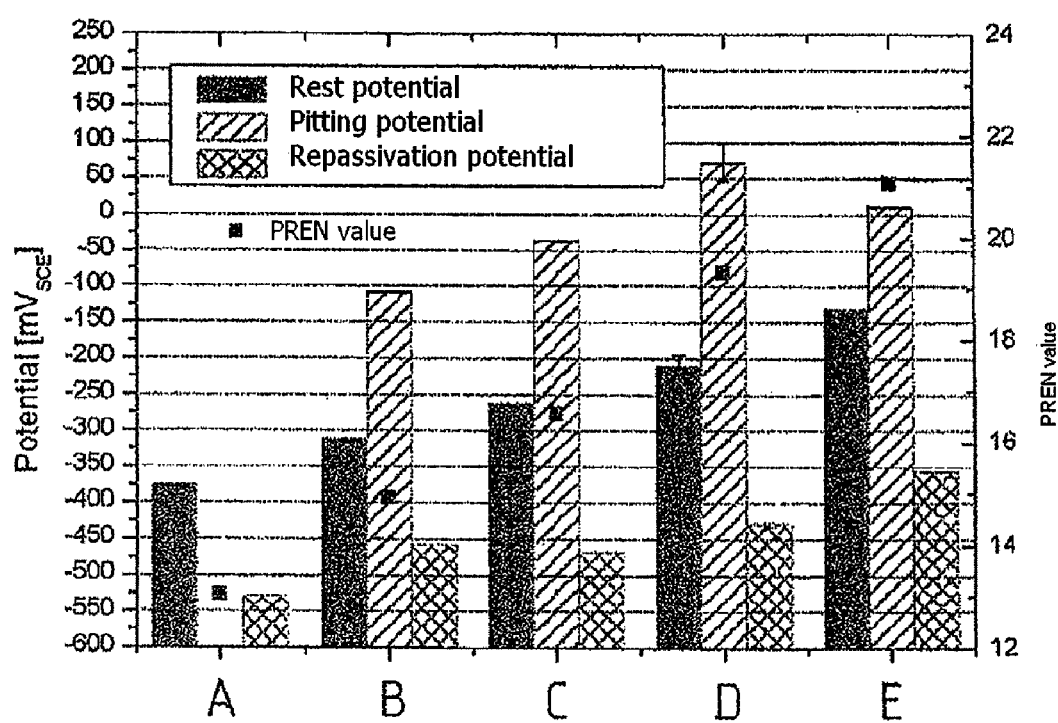
FIG. 4: Shows pitting potential, rest potential and repassivation potential for alloys A through E.

FIG. 4 shows that for alloys A through E, thus with increasing chromium content, the pitting potential or the corrosion resistance of alloy A up to alloy D increases, then decreases again with alloy E. Since the chromium content is too low, alloys A, B and C do not exhibit the desired corrosion resistance, but alloy D does. Alloy E has a higher chromium content than alloy D, which is why a higher PREN value is given. The PREN value (calculated according to: PREN=% Cr+3.3% Mo*(16-30% N)) stands for corrosion resistance and one skilled in the art would expect a higher corrosion resistance with higher PREN value. In fact, however, $M_7C_3$ carbides precipitate with increasing chromium content, in particular above 11.5% by weight. Although carbides of this type provide hardness, according to their stoichiometry they have a high chromium content. The result is that the formation of carbides of this type leads to the extraction of chromium from the matrix, which reduces a corrosion resistance.

Figure 5A:
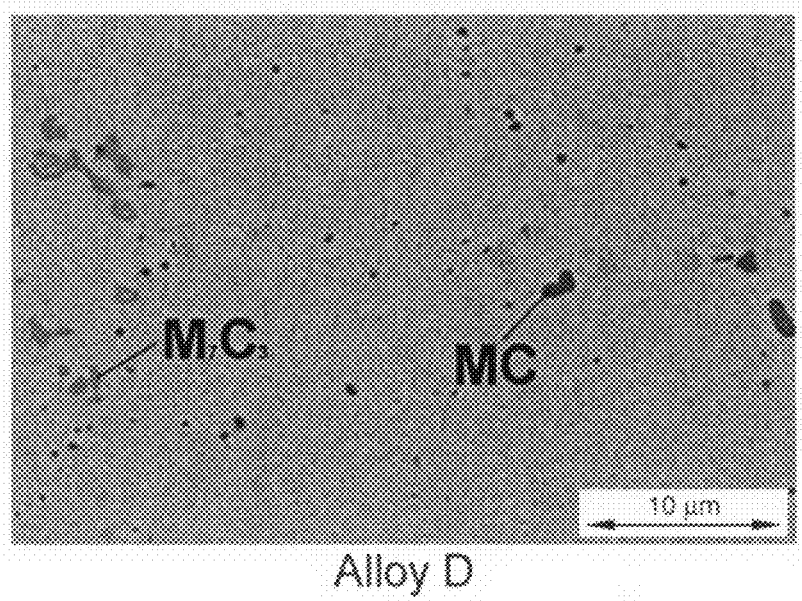
FIGS. 5(a) and 5(b): Shows micrographs of alloys D and G, respectively.
Figure 5B:
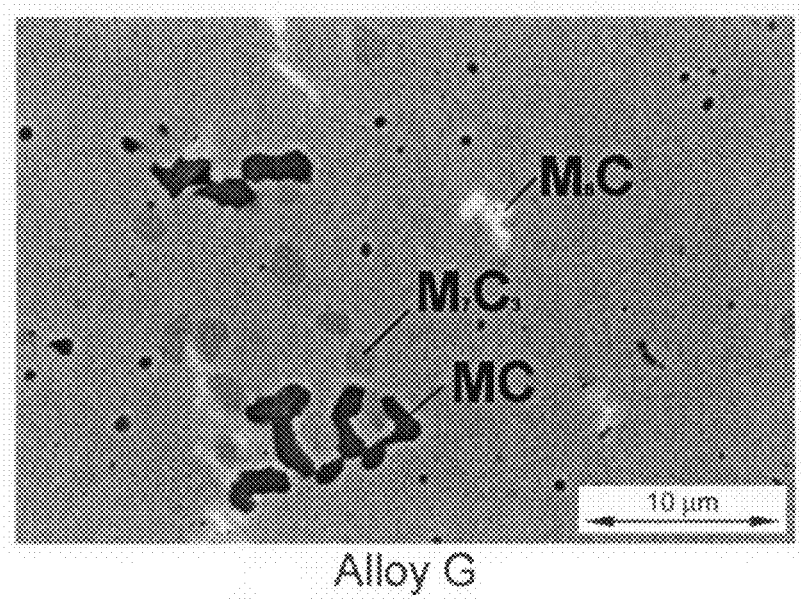

With regard to the effects of different molybdenum contents, the highest corrosion resistance with alloys according to the invention was determined with alloy D, in which mainly MC carbides are present. A lower molybdenum content is given in alloy F, which leads to a lower corrosion resistance. However, in alloy G, although a molybdenum content is higher, proportions of $M_7C_3$ carbides are also higher and in addition $M_6C$ carbides also occur, as can be seen from FIGS. 5(a) and 5(b). Despite higher molybdenum content, alloy G is therefore less corrosion-resistant than alloy D.

Figure 6:
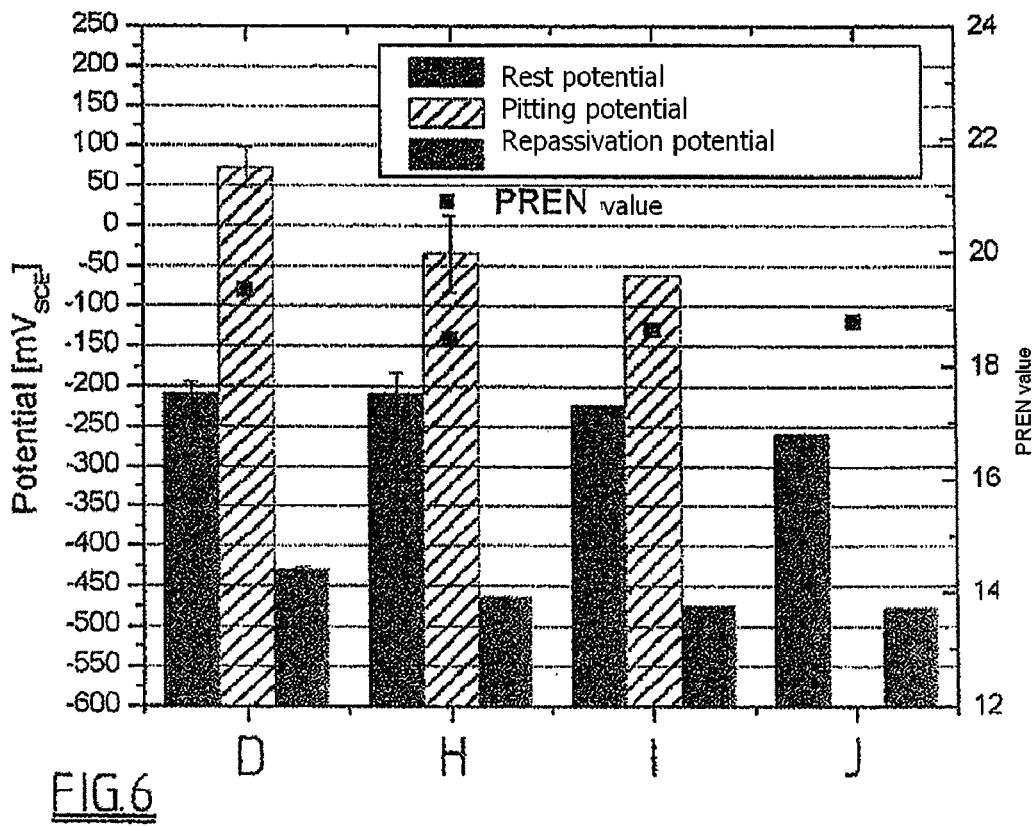
FIG. 6: Shows pitting potential, rest potential and repassivation potential for alloys H, I and J compared to alloy D.
Figure 7:
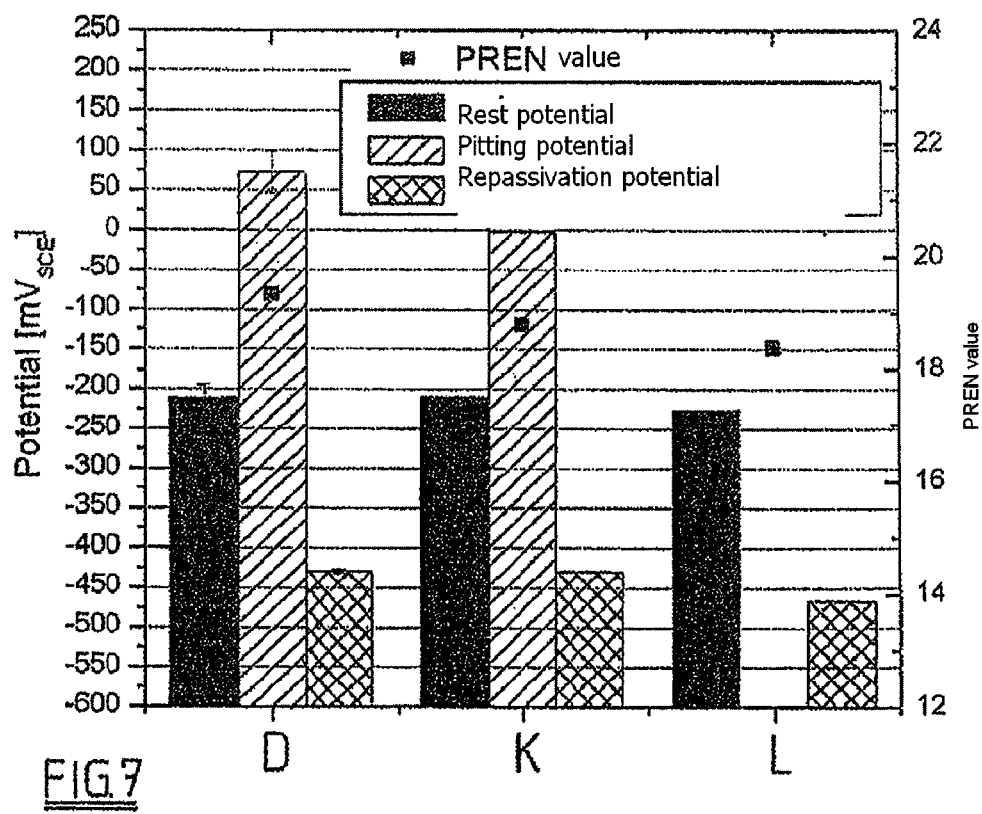
FIG. 7: Shows pitting potential, rest potential and repassivation potential for alloys K and L compared to alloy D.

The influence of cobalt and nickel is evident from FIGS. 6 (Co) and 7 (Ni). It is true for both elements that the corrosion resistance decreases with increasing content. Accordingly, alloys I, J, K and L cannot provide the required corrosion resistance. The reason for this probably lies in the increased affinity for forming $M_7C_3$ carbides, which is caused by cobalt and/or nickel.

To sum up the corrosion tests, it can be stated that alloys D, F, G and H meet the requirements for the corrosion properties.

In an overall consideration of mechanical properties, wearing properties and rollover properties as well as corrosion resistance, it is thus shown that alloys D, F and G have the set profile of properties, whereas the other alloys tested do not reach a minimum value at least with respect to one property.

Figure 8:
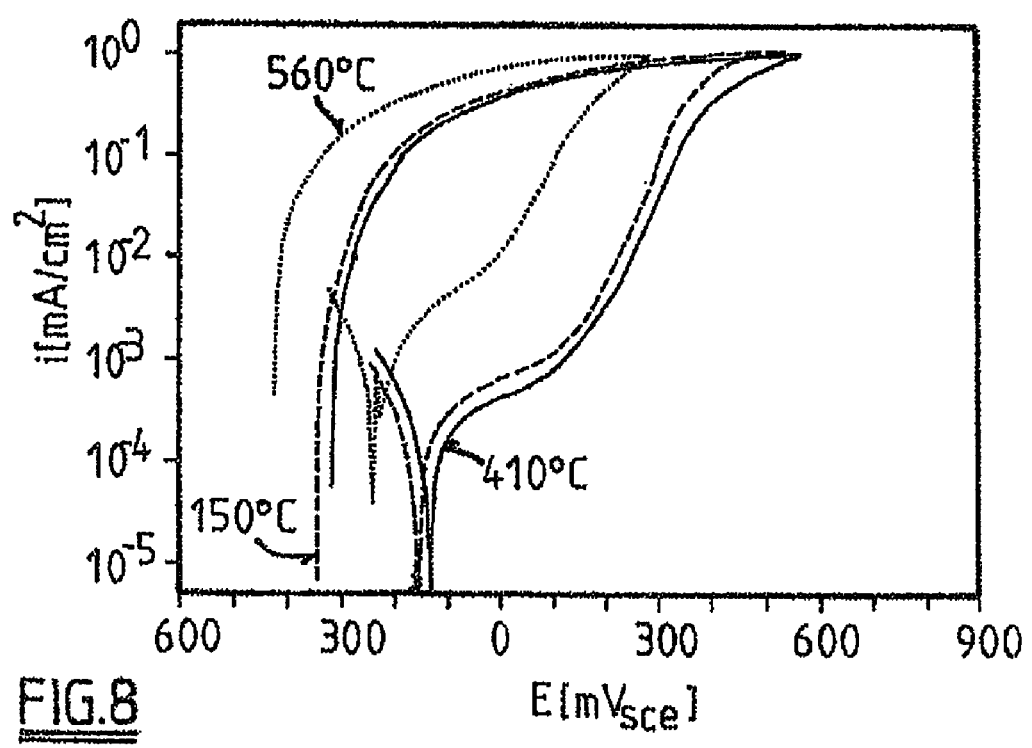
FIG. 8: Shows current density potential curves of alloy D for different tempering temperatures.

An alloy D produced on an industrial scale was finally also tested with respect to changes in properties with differing tempering temperature. It was thereby surprisingly shown that a corrosion resistance depends on the tempering temperature. As current density potential curves in FIG. 8 show, a high pitting potential is given for alloy D at tempering temperatures up to 450° C. However, at a higher tempering temperature of 560° C., a lower pitting potential of approx. +20 mV is given.

Figure 9:
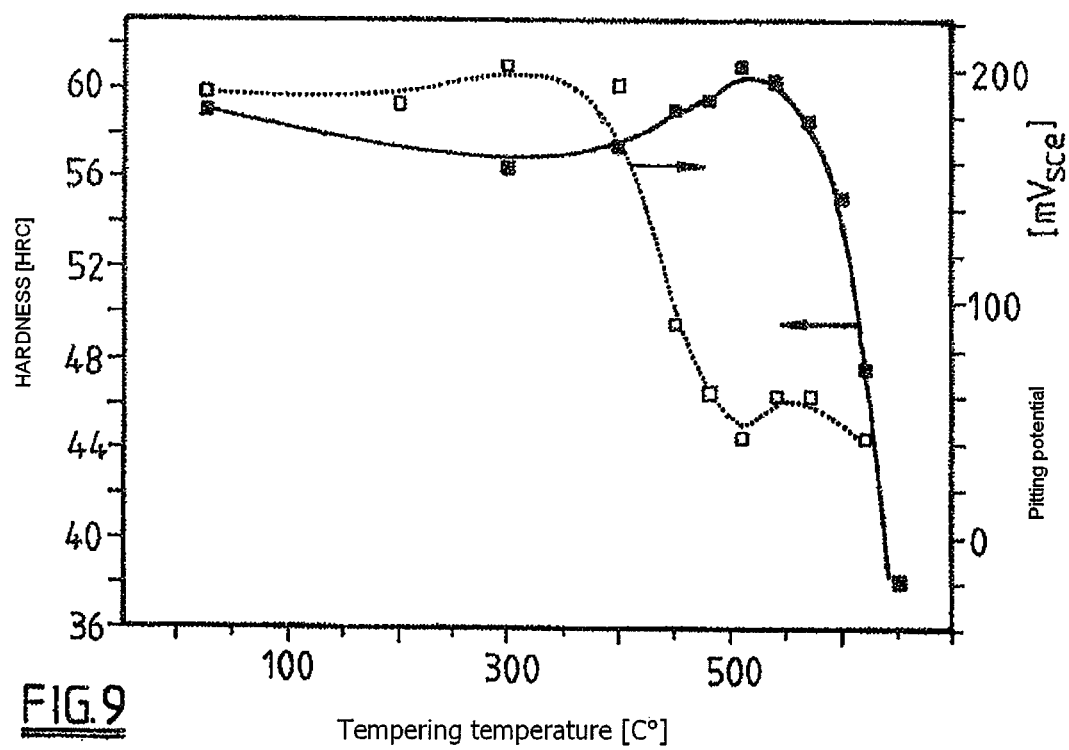
FIG. 9: Shows a diagram of the hardness pattern and the pattern of the pitting potential of alloy D for different tempering temperatures.

FIG. 9 shows patterns of the pitting potential and the hardness with variation of the tempering temperature. It is evident that the pitting potential is over +160 $mV_{sce}$ at tempering temperatures up to 450° C., and after that drops sharply to approx. 40 to 60 $mV_{sce}$. On the other hand it is also evident that a hardness of 59 HRC that is desirable for practice can already be achieved at temperatures below 450° C. Optimal results both with regard to mechanical properties and wearing behavior as well as with regard to high corrosion resistance can thus be obtained at tempering temperatures up to 450° C.

Figure 10A:
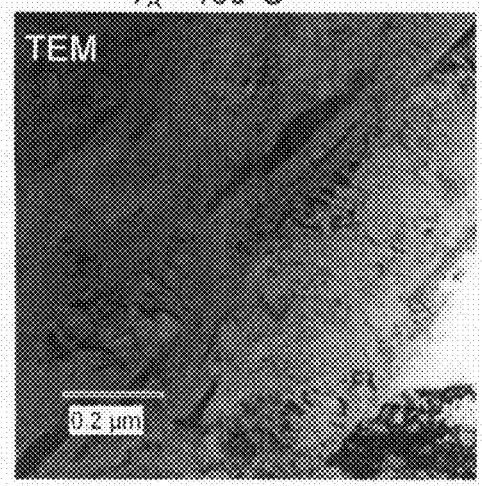
FIGS. 10(a)-(b): Show transmission electron microscopy (TEM) and chromium distribution images, respectively, of alloy D after a triple tempering for two: hours at 400°.
Figure 10C:
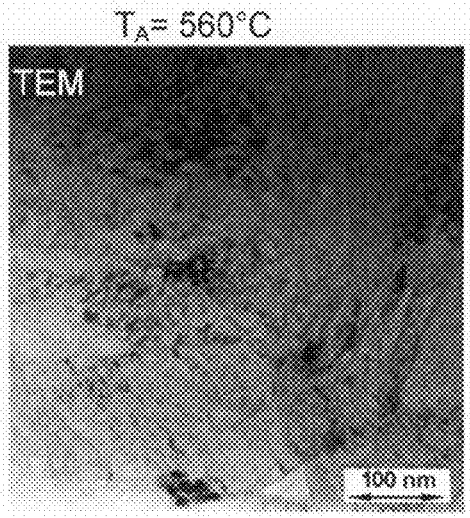
FIGS. 10(c)-(d): Show transmission electron microscopy (TEM) and chromium distribution images, respectively, of alloy D after a triple tempering for two hours at 560° C.
Figure 10B:
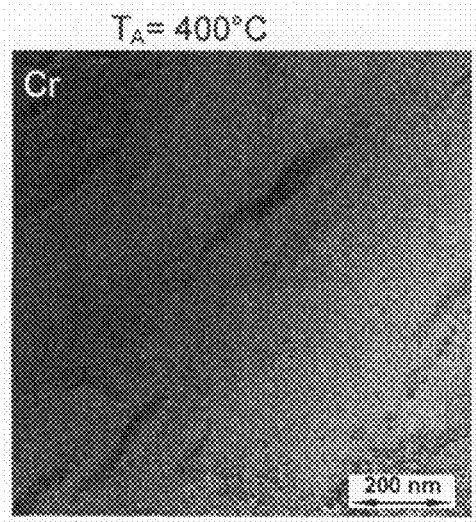
Figure 10D:
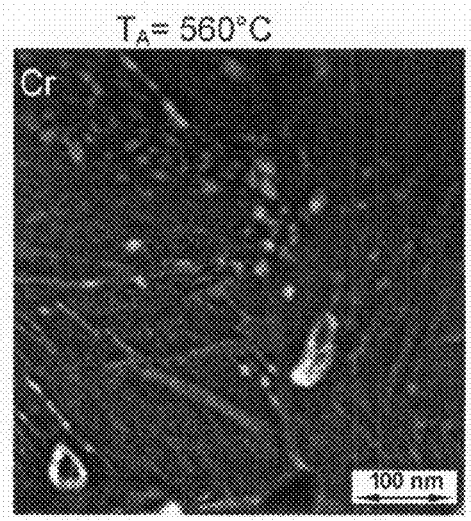

FIGS. 10(a) and (c) finally shows TEM images, and FIGS. 10(b) and 10(d) show Cr mapping images, for an alloy D that was tempered at 400° C. or 560° C. The Cr mapping images show that with the alloy tempered at 560° C. (FIG. 10(d)) light areas are given in the boundary areas of the carbides, which suggests a high chromium content in some areas. In contrast, the surrounding matrix appears darker due to a low chromium content. This shows that the matrix in the surface area of the secondary carbides is depleted in chromium at higher tempering temperatures, which leads to a reduction in the corrosion resistance.

Tests on the carbide content of alloys D produced on an industrial scale and heat treated showed that a content of MC carbides was between 0.7 percent by volume at an austenitization temperature of 1140° C. and 1.8 percent by volume at an austenitization temperature of 1080° C. A content of $M_7C_3$ carbides was 0.2% by volume (austenitization temperature of 1140° C.) or no $M_7C_3$ carbides could be determined (austenitization temperature of 1080° C.). In every case, therefore, more than 75% of the available carbides are present as MC carbides.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Further, when an amount, concentration, or other value or parameter, is given as upper preferable values and lower preferable values, this is to be understood as ally disclosing all ranges formed from any pair of an upper preferred value and a lower preferred value, regardless whether ranges are separately disclosed.

What is claimed:

1. An alloy for aircraft roller bearings, wherein the alloy comprises:
   from 0.45 to 0.85 wt. % of carbon,
   not more than 2.0 wt. % of manganese,
   from 0.05 to 1.0 wt. % of silicon,
   from 8.5 to 11.5 wt. % of chromium,
   from 2.5 to 4.5 wt. % of molybdenum,
   from 1.65 to 2.5 wt. % of vanadium,
   not more than 2.0 wt. % of tungsten,
   not more than 0.5 wt. % of niobium,
   not more than 0.5 wt. % of tantalum,
   from 0.02 to 3.0 wt. % of nickel,
   not more than 0.5 wt. % of cobalt,
   not more than 0.1 wt. % of aluminum,
   not more than 0.01 wt. % of nitrogen,
   balance iron and impurities due to production.

2. The alloy of claim 1, wherein the alloy comprises from 0.55 to 0.85 wt. % of carbon.

3. The alloy of claim 2, wherein the alloy comprises not more than 0.75 wt. % of carbon.

4. The alloy of claim 1, wherein the alloy comprises from 9.5 to 10.5 wt. % of chromium.

5. The alloy of claim 1, wherein the alloy comprises not more than 3.5 wt. % of molybdenum.

6. The alloy of claim 5, wherein the alloy comprises from 2.65 to 3.25 wt. % of molybdenum.

7. The alloy of claim 1, wherein the alloy comprises from 1.8 to 2.25 wt. % of vanadium.

8. The alloy of claim 1, wherein the alloy comprises not more than 0.5 wt. % of tungsten.

9. The alloy of claim 1, wherein the alloy comprises not more than 0.5 wt. % of nickel.

10. The alloy of claim 1, wherein the alloy comprises from 0.5 to 7% by volume of carbides.

11. The alloy of claim 1, wherein the alloy comprises less than 3% by volume of metal carbides of formula $M_7C_3$.

12. An alloy for aircraft roller bearings, wherein the alloy comprises:
    from 0.55 to 0.85 wt. % of carbon,
    not more than 0.3 wt. % of manganese,
    from 0.05 to 0.2 wt. % of silicon,
    from 9.5 to 10.5 wt. % of chromium,
    from 2.5 to 3.5 wt. % of molybdenum,
    from 1.65 to 2.5 wt. % of vanadium,
    not more than 0.5 wt. % of tungsten,
    not more than 0.5 wt. % of niobium,
    not more than 0.5 wt. % of tantalum,
    from 0.02 to 0.5 wt. % of nickel,
    not more than 0.5 wt. % of cobalt,
    not more than 0.1 wt. % of aluminum,
    not more than 0.01 wt. % of nitrogen,
    balance iron and impurities due to production.

13. An alloy for aircraft roller bearings, wherein the alloy comprises:
    from 0.55 to 0.75 wt. % of carbon,
    from 0.21 to 0.3 wt. % of manganese,
    from 0.15 to 0.2 wt. % of silicon,
    from 9.5 to 10.5 wt. % of chromium,
    from 2.65 to 3.25 wt. % of molybdenum,
    from 1.8 to 2.25 wt. % of vanadium,
    not more than 0.5 wt. % of tungsten,
    not more than 0.5 wt. % of niobium,
    not more than 0.5 wt. % of tantalum,
    from 0.02 to 0.5 wt. % of nickel,
    not more than 0.5 wt. % of cobalt,
    not more than 0.1 wt. % of aluminum,
    not more than 0.01 wt. % of nitrogen,
    balance iron and impurities due to production.

14. A bearing or bearing part, wherein the bearing or bearing part comprises the alloy of claim 1.

15. A bearing or bearing part, wherein the bearing or bearing part consists of the alloy of claim 1.

16. The bearing or bearing part of claim 14, wherein the bearing or bearing part is a roller bearing or roller bearing part.

17. An aircraft turbine, wherein the turbine comprises the bearing or bearing part of claim 14.

18. A method of making a part or component of an aircraft, wherein the method comprises forming the part or component from the alloy of claim 1.

19. The alloy of claim 1, wherein the alloy comprises not more than 0.27 wt. % of manganese.

20. A bearing or bearing part, wherein the bearing or bearing part comprises the alloy of claim 13.

* * * * *